United States Patent
Leconte

(10) Patent No.: US 10,712,439 B2
(45) Date of Patent: Jul. 14, 2020

(54) METHOD FOR DETERMINING A DISTANCE BETWEEN A VEHICLE AND AN IDENTIFIER

(71) Applicant: VALEO COMFORT AND DRIVING ASSISTANCE, Créteil (FR)

(72) Inventor: Eric Leconte, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 212 days.

(21) Appl. No.: 15/759,975

(22) PCT Filed: Sep. 16, 2016

(86) PCT No.: PCT/EP2016/072061
§ 371 (c)(1),
(2) Date: Mar. 14, 2018

(87) PCT Pub. No.: WO2017/046386
PCT Pub. Date: Mar. 23, 2017

(65) Prior Publication Data
US 2018/0252805 A1 Sep. 6, 2018

(30) Foreign Application Priority Data
Sep. 18, 2015 (FR) .................................. 15 58833

(51) Int. Cl.
*G01S 13/84* (2006.01)
*G07C 9/00* (2020.01)
*G01S 13/82* (2006.01)

(52) U.S. Cl.
CPC ............ *G01S 13/84* (2013.01); *G01S 13/825* (2013.01); *G07C 9/00309* (2013.01); *G07C 2209/61* (2013.01); *G07C 2209/63* (2013.01)

(58) Field of Classification Search
None
See application file for complete search history.

(56) References Cited

U.S. PATENT DOCUMENTS

| 2002/0094786 A1 | 7/2002 | Berliner et al. |
| 2004/0000986 A1 | 1/2004 | Ott |
| 2018/0093642 A1* | 4/2018 | Casagrande ............ B60R 25/24 |

OTHER PUBLICATIONS

International Search Report issued in PCT/EP2016/072061 dated Nov. 25, 2016 (2 pages).

(Continued)

*Primary Examiner* — Whitney Moore
(74) *Attorney, Agent, or Firm* — Osha Liang LLP

(57) ABSTRACT

A method for measuring a distance separating a vehicle and an identifier is disclosed. The method includes transmitting, from the vehicle to the identifier, a first train of first sinusoidal signals, receiving, by the identifier, an image train of second sinusoidal signals corresponding to the first sinusoidal signals, generating, by the identifier, measurements of phases and amplitudes of the second sinusoidal signals that are altered from the first sinusoidal signals by transmission from the vehicle to the identifier, constructing a frequency spectrum based on the measurements and a second image train received by the vehicle from the identifier, where the frequency spectrum is constructed by detecting spectral lines of the first image train and the second image train, performing an inverse Fourier transform of the frequency spectrum to obtain a temporal signature, and calculating the distance on the basis of an intermediate time associated with a maximum of the temporal signature.

6 Claims, 2 Drawing Sheets

(56) References Cited

OTHER PUBLICATIONS

Written Opinion of the International Searching Authority issued in PCT/EP2016/072061 dated Nov. 25, 2016 (6 pages).

* cited by examiner

METHOD FOR DETERMINING A DISTANCE BETWEEN A VEHICLE AND AN IDENTIFIER

TECHNICAL FIELD OF THE INVENTION

The technical field of the invention is, in general, hands-free access and starting systems for vehicles. The invention relates more particularly to a method for determining a distance separating a vehicle from a hands-free identifier that makes it possible to access the vehicle and/or to start the vehicle.

PRIOR ART

What are termed "hands-free" access and starting systems, allowing the doors of a vehicle to be locked and unlocked and the vehicle engine to be started without the use of a traditional key, are nowadays widespread on the market.

Conventionally, when a user wishing to unlock a door of a vehicle touches a capacitive sensor or is detected by an infrared sensor situated on the door handle, a central computer of the vehicle triggers the transmission of a low-frequency (between 20 and 150 kHz) interrogation signal by a low-frequency antenna of the vehicle. As an alternative, the low-frequency antenna may send such low-frequency interrogation signals periodically (reference is made to "polling"). If an identifier (which conventionally takes the form of a key or an electronic card, or even a smartphone having a suitable activated application) in the proximity of the vehicle captures an interrogation signal, it responds by sending an unlocking code to the central computer by radio signal. A radio receiver of the vehicle then receives the radio signal: if the locking code is recognized by the central computer, then the latter orders the unlocking of the door.

The method is substantially the same when the user wishes to start the vehicle and presses a switch situated in the passenger compartment: in this case, the engine is started by the central computer only if a starting code sent by the identifier is recognized by the central computer.

To increase the security of hands-free access and starting systems, it is desirable for additional conditions to be met before locking, unlocking or starting is triggered. It is desirable in particular for the location of the identifier to be in keeping with the action to be performed, for example:

For unlocking, the identifier should be located within a maximum perimeter, for example of 2 meters, around the vehicle For locking, there should be no identifier located inside the passenger compartment For starting, the identifier should be located inside the passenger compartment.

Thus, a reliable measurement of distance between the identifier and the vehicle is necessary.

It is known to use IR-UWB (impulse radio ultra-wideband) technology to determine the vehicle-identifier distance, by way of measuring signal propagation time (or 'time-of-flight'). In this method, a first UWB transceiver, situated at the vehicle, sends a pulse, by radio signal, at a time t0, which pulse is received by a second UWB transceiver belonging to the identifier. Now, due to the refractions and reflections to which the wave that is sent is subjected on its path, the second transceiver receives not only the direct pulse but also signals of the pulse coming from multiple paths. The total signal that is received is commonly called the signature. The second transceiver dates the maximum amplitude of the signature, which corresponds a priori to the time t1 of receipt of the direct pulse. Next, the second transceiver returns, to the first transceiver, a pulse at a time t2, which pulse is received and dated (t3) in the same way by the first transceiver. The second transceiver also returns, to the first transceiver, the information t2-t1.

The distance is then determined by the first transceiver using the following formulae:

$$t3-t0=(t1-t0)+(t2-t1)+(t3-t2)$$

Now, $t1-t0=t3-t2=d/c$, where d is the distance separating the vehicle from the identifier, and c is the speed of propagation of the signal between the vehicle and the identifier.

$$\text{Thus, } t3-t0=2*(t1-t0)+(t2-t1)=2d/c+(t2-t1)$$

$$\text{Hence: } d=(c/2)*[(t3-t0)-(t2-t1)].$$

Since t3-t0 and t2-t1 are known by the first transceiver, the distance d is able to be determined by the first transceiver.

This method has drawbacks, however. A high consumption of energy is required on the part of the receivers, the latter having to receive very weak signals shrouded in noise. In addition, the power required to generate the pulses is very high. The autonomy of the identifier is therefore affected.

GENERAL DESCRIPTION OF THE INVENTION

The aim of the invention is therefore to propose a method for measuring distance between a vehicle and an identifier, making it possible to dispense with the transmission of pulses.

To this end, the invention proposes a method for measuring a distance separating a vehicle and an identifier for accessing and starting the vehicle, the vehicle and the identifier being synchronized, the method comprising:

transmission, from the vehicle to the identifier, of a first train of N first sinusoidal signals with identical amplitudes and with regularly spaced respective frequencies $f_p$, $p \in [1;N]$ measurement of phases and of amplitudes, by the identifier, of signals of a first received image train corresponding to the first train altered by the transmission transmission of the measured phases and amplitudes, from the identifier to the vehicle transmission, from the identifier to the vehicle, of a second train identical to the first train construction of a frequency spectrum of the first image train and of a second image train corresponding to the second train altered by the transmission an inverse Fourier transform, making it possible to obtain a temporal signature determination of an intermediate time associated with a maximum of the temporal signature calculation of the distance on the basis of the intermediate time.

Besides the features that have just been outlined in the previous paragraph, the measurement method according to the invention may have one or more additional features from among the following, which are considered individually or in any technically feasible combination.

In one nonlimiting embodiment, the frequencies $f_p$ are such that N=80, f1=2400 MHz and, for all values of p between 1 and 79, $f_{p+1}-f_p=1$ MHz. The associated frequency range corresponds to Bluetooth. The transmitter may thus be integrated into a Bluetooth chip. It is noted that, if the transmitter belongs to an identifier for remotely controlling a vehicle, or if the identifier takes the form of a smartphone having a suitable application, then it natively includes a Bluetooth chip.

In one nonlimiting embodiment, the calculation includes determining a maximum lobe of the temporal signature, and determining a start time of said maximum lobe.

In one nonlimiting embodiment, the inverse Fourier transform is performed by inverse fast Fourier transform (or IFFT). To this end, data are added to the measured data in order to obtain a frequency spectrum with N frequencies, where N is a power of 2 ($N=2^k$, k being an integer).

In one nonlimiting embodiment, the method includes adding samples to the measured image trains in order to obtain a number of frequencies of the frequency spectrum greater than the number of measured frequencies. This makes it possible to obtain a more accurate temporal signature.

In one nonlimiting embodiment, the measurement method includes a prior step of synchronizing the identifier and the vehicle, in particular using a Bluetooth protocol.

The invention and the various applications thereof will be better understood on reading the following description and on examining the accompanying figures.

BRIEF DESCRIPTION OF THE FIGURES

The figures are presented only by way of entirely nonlimiting indication of the invention. In the figures.

DETAILED DESCRIPTION OF AT LEAST ONE EMBODIMENT OF THE INVENTION

Unless indicated otherwise, one and the same element appearing in different figures has a single reference.

The method described hereinafter makes it possible to calculate a distance R between a vehicle V and what is termed a hands-free identifier I, said identifier I making it possible to control, using a "hands-free" principle, access to or starting of the vehicle V. The identifier I is for example an electronic key or card, or a smartphone having a suitable application.

The vehicle V includes a first transceiver device Dv, and the identifier I includes a second transceiver device Di. As the first transceiver device Dv and the second transceiver device Di are similar, a general description is given hereinafter.

Figure 1:
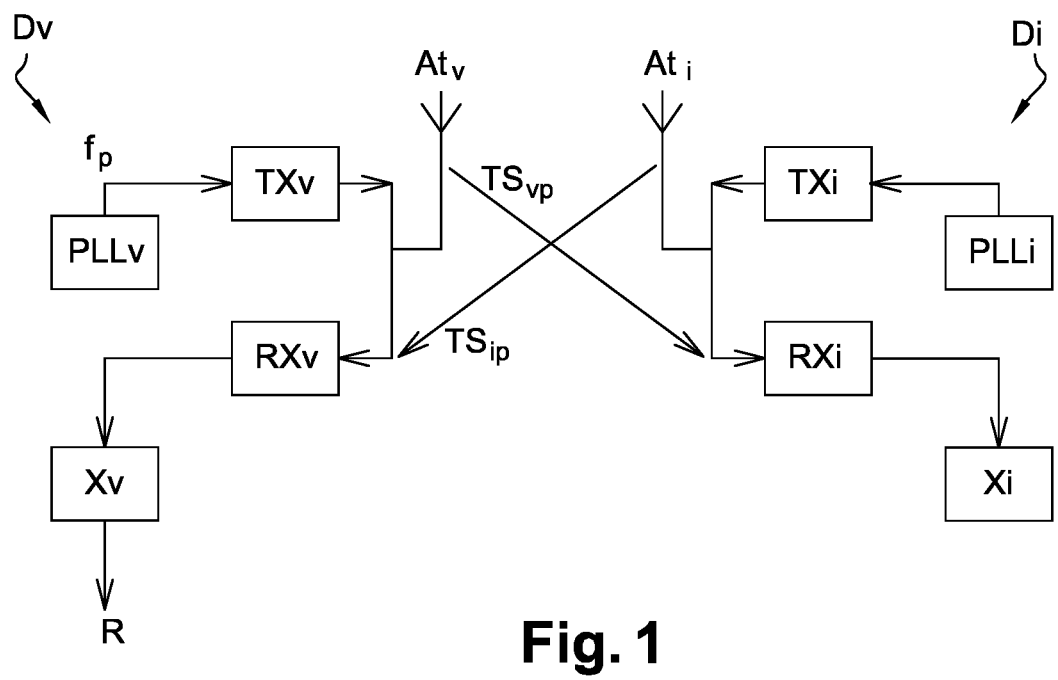
FIG. 1 shows two transceiver devices belonging to a vehicle and an identifier, respectively, between which it is desired to know the distance, the devices being designed to implement a method according to one embodiment of the invention.

With reference to FIG. 1, a transceiver device Dp, the index p indiscriminately being v or i, includes:

a transmitter TXp of radio signals (with a frequency at least equal to 1 GHz)
a receiver RXp of radio signals (with a frequency at least equal to 1 GHz)
an antenna Atp to which the transmitter TXp and the receiver RXp are connected
a phase-locked loop PLLp for supplying signals of various frequencies to the transmitter TXp
a computer Xp for performing calculations on the basis of signals received by the receiver RXp.

It is noted that a smartphone natively has all of the components of the described transceiver device Dp. In one preferred embodiment, the identifier I is therefore a smartphone having a suitable application for the hands-free accessing and starting of the vehicle. The various components of the transceiver device Di are advantageously triggered and controlled by the application installed on the smartphone.

Figure 2:
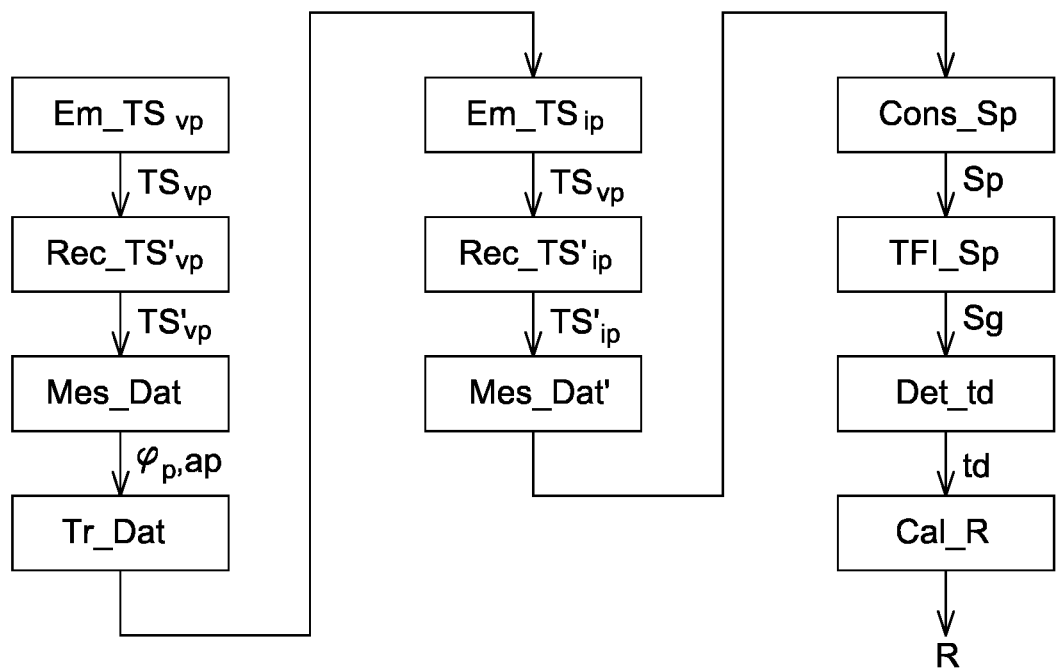
FIG. 2 shows a block diagram showing steps of the method.
Figure 3:
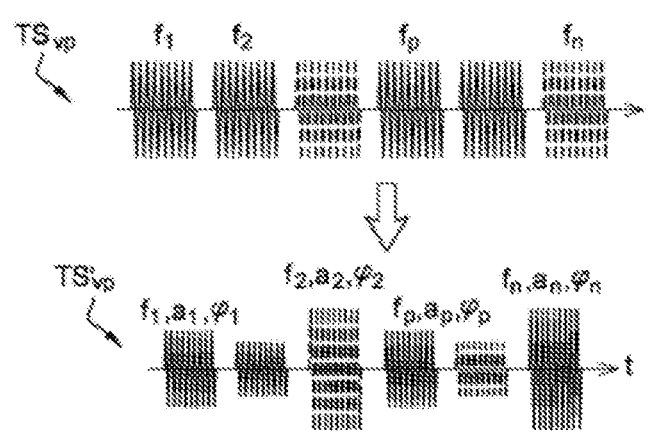
FIG. 3 shows signals exchanged between the transceiver devices during steps of the method.

The method according to the invention is implemented by the first transceiver device Dv and the second transceiver device Di. It is noted that the first transceiver device Dv and the second transceiver device Di have been synchronized with one another beforehand, for example via a Bluetooth Low Energy protocol (it is noted that a smartphone natively has a Bluetooth chip). With reference to FIG. 2, the method METH includes the following steps.

transmission $Em\_TS_{vp}$, from the transmitter TXv of the vehicle V to the receiver RXi of the identifier I, of a first train $TS_{vp}$ of N first sinusoidal signals $S_{vp}$ with identical phases and amplitudes, and with respective frequencies $f_p$, p∈[1;N]. The first train $TS_{vp}$ is shown in FIG. 3. Advantageously, the frequencies $f_p$ are such that N=80, $f_1$=2.4 GHz, $f_{80}$=2.480 GHz and, for all values of p between 1 and 79, $f_{p+1}-f_p$=1 MHz. Specifically, these frequencies correspond to the Bluetooth Low Energy channels. It is noted that the first train $TS_{vp}$ is generated by the phase-locked loop PLLv of the vehicle V.

reception $Rec\_TS_{vp}'$, by the receiver RXi of the identifier I, of a first image train $TS_{vp}'$ corresponding to the first train $TS_{vp}$ altered by the transmission $Em\_TS_{vp}$. The first image train $TS_{vp}'$ is shown in FIG. 3. The first image train $TS_{vp}'$ is formed of N image sinusoidal signals $S_{vp}'$ with phases $\varphi_p$, amplitudes $a_p$ and frequencies $f_p$, p∈[1;N], respectively. If the frequencies $f_p$ of the first signals $S_{vp}$ are not altered by the transmission, their amplitude and their phase are altered. Specifically, the reflection and refraction phenomena to which the signals are subjected between the transmitter TXv of the vehicle V and the receiver RXi of the identifier I shift phase and modify the amplitude of the signals.

measurement Mes_Dat, by the receiver RXi of the identifier I, of phases $\varphi_p$ and of amplitudes $a_p$ of the signals $S_{vp}'$ of the first image train $TS_{vp}'$.

transmission Tr_Dat, in the form of data, of the amplitudes $a_p$ and the phases $\varphi_p$ measured by the identifier I in the preceding step. These data are for example transmitted using a Bluetooth Low Energy protocol.

transmission $Em\_TS_{ip}$, from the transmitter TXi of the identifier I to the receiver RXv of the vehicle V, of a second train $TSi_p$ identical to the first train $TS_{vp}$. It is noted that the second train $IS_{ip}$ is generated by the phase-locked loop PLLi of the identifier.

reception $Rec\_TS_{ip}'$, by the receiver RXv of the vehicle V, of a second image train $TS_{ip}'$ corresponding to the second train $TS_{ip}$ altered by the transmission $Em\_TS_{ip}$.

measurement, by the receiver RXv of the vehicle V, of phases and of amplitudes of the signals of the second image train $TS_{ip}'$ At a time t4, construction Cons_Sp of a frequency spectrum Sp formed by the first image train $TS_{vp}'$ and the second image train $TSi_p'$, through detection of the spectral lines of the first image train $TS_{vp}'$ and of the second image train $TS_{ip}'$.

an inverse Fourier transform TFI_Sp making it possible to obtain a temporal signature Sg. The temporal signature Sg is equivalent to the one that would have been obtained if a pulse had been transmitted instead of the first and second trains $TS_{vp}$ and $TS_{ip}$.

determination Det_$t_d$ of an intermediate time $t_d$ associated with a maximum of the temporal signature Sg.

calculation Cal_R, by the computer Xv of the vehicle V, of the distance R on the basis of the intermediate time $t_d$, using the following formula:

$$R = \frac{c}{2} \cdot t_d$$

where c is the speed of propagation of the signals exchanged between the vehicle V and the identifier I.

On the basis of the calculated distance R and depending on a specific requested function (opening of a door, closure of a door, starting of the vehicle, for example), the computer Xv of the vehicle V is able to determine whether or not the function should be performed.

As an alternative, the intermediate time $t_d$ could be determined by looking for the value of the start of the maximum lobe of the temporal signature. The start of the lobe may be determined by the difference between the maximum value and a constant (for example 20 dB). As an alternative, the start of the lobe is determined by the difference between the maximum value and a value dependent on the average value of the lobes furthest from the maximum lobe of the temporal signature.

Naturally, the steps of the method could, as an alternative, be performed in another technically feasible order than the one presented above.

The invention claimed is:

1. A method for measuring a distance separating a vehicle and an identifier for accessing and starting the vehicle, the vehicle and the identifier being synchronized, the method comprising:
    transmitting, from the vehicle to the identifier, a first train of N first sinusoidal signals with identical amplitudes and with regularly spaced respective frequencies $f_p$, P∈[1;N];
    receiving, by the identifier, an image train of N second sinusoidal signals corresponding to the N first sinusoidal signals, wherein the N second sinusoidal signals comprise phases and amplitudes that are altered from the N first sinusoidal signals by transmission from the vehicle to the identifier;
    generating, by the identifier, measurements of the phases and the amplitudes of the N second sinusoidal signals;
    transmitting the measurments of the phases and the amplitudes of the N second sinusoidal signals, from the identifier to the vehicle;
    transmitting, from the identifier to the vehicle, a second train of N third sinusoidal signals that are identical to the N first sinusoidal signals of the first train;
    receiving, by the vehicle from the identifier, a second image train corresponding to the second train altered by transmission from the identifier to the vehicle;
    constructing a frequency spectrum based on the measurements of the phases and the amplitudes transmitted to the vehicle and the second image train received by the vehicle, wherein the frequency spectrum is constructed by detecting spectral lines of the first image train and the second image train;
    performing, by a computer processor, an inverse Fourier transform of the frequency spectrum to obtain a temporal signature;
    determining, by the computer processor, an intermediate time associated with a maximum of the temporal signature; and
    calculating by the computer processor, the distance on the basis of the intermediate time.

2. The measurement method as claimed in claim 1, wherein the frequencies $f_p$ are such that N=80, $f_1$=2400 MHz and, for all values of p between 1 and 79, $f_{p+1}-f_p$=1 MHz.

3. The measurement method as claimed in claim 1, wherein the calculation includes determining a maximum lobe of the temporal signature, and determining a start time of said maximum lobe.

4. The measurement method as claimed in claim 3, further comprising a prior step of synchronizing the identifier and the vehicle using a Bluetooth protocol.

5. The measurement method as claimed in claim 1, wherein the inverse Fourier transform is performed by inverse fast Fourier transform.

6. The measurement method as claimed in claim 5, further comprising adding spectral line samples to the measured image trains.

* * * * *